US008899286B2

(12) United States Patent
Dautrey

(10) Patent No.: US 8,899,286 B2
(45) Date of Patent: Dec. 2, 2014

(54) PNEUMATIC TIRE TREAD

(75) Inventor: Nicolas Dautrey, Ota (JP)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 70 days.

(21) Appl. No.: 13/514,761

(22) PCT Filed: Dec. 25, 2009

(86) PCT No.: PCT/JP2009/071650
§ 371 (c)(1),
(2), (4) Date: Sep. 11, 2012

(87) PCT Pub. No.: WO2011/077561
PCT Pub. Date: Jun. 30, 2011

(65) Prior Publication Data
US 2012/0325386 A1 Dec. 27, 2012

(51) Int. Cl.
*B60C 11/03* (2006.01)
*B60C 11/04* (2006.01)
*B60C 11/117* (2006.01)
*B60C 19/00* (2006.01)

(52) U.S. Cl.
CPC ..... *B60C 11/0309* (2013.04); *B60C 2011/0381* (2013.04); *B60C 2011/0386* (2013.04); *B60C 11/033* (2013.04); *B60C 19/002* (2013.04); *B60C 2011/0341* (2013.04); *Y10S 152/901* (2013.01)
USPC .................. 152/209.18; 152/209.13; 152/901

(58) Field of Classification Search
CPC ............ B60C 11/0316; B60C 11/0318; B60C 11/032; B60C 11/033; B60C 11/0332; B60C 11/0309; B60C 2011/0386; B60C 2011/0381
USPC ................... 152/209.13, 209.15, 209.18, 901
See application file for complete search history.

(56) References Cited

U.S. PATENT DOCUMENTS

| 2007/0051448 A1* | 3/2007 | Yumii ..................... 152/209.18 |
| 2010/0206445 A1* | 8/2010 | Dobashi et al. .......... 152/209.15 |
| 2010/0212796 A1 | 8/2010 | Iwabuchi |

FOREIGN PATENT DOCUMENTS

| JP | 2006-151309 A | 6/2006 |
| JP | 2008-238867 A | 10/2008 |
| JP | 2008-308131 A | 12/2008 |
| JP | 2009-067173 A | 4/2009 |
| WO | WO 2004/103737 A1 | 12/2004 |

* cited by examiner

OTHER PUBLICATIONS

International Search Report (PCT/ISA/210) issued on Mar. 2, 2010, by the Japanese Patent Office as the International Searching Authority for International Application No. PCT/JP2009/071650.

*Primary Examiner* — Justin Fischer
*Assistant Examiner* — Kendra Shin
(74) *Attorney, Agent, or Firm* — Dickinson Wright PLLC

(57) ABSTRACT

Pneumatic tire tread which reduces tread pattern noise while suppressing air column resonance from circumferential grooves is provided with a number of sets of resonators and at least two types of branch groove shapes; the length of the first branch grooves at least 40% of the length of the contact surface, and groove width between 10% and 25% of the circumferential groove width; the length of the second branch grooves between 40% and 90% of the length of the first branch grooves, and the groove width no less than the first branch groove width; first openings and second openings alternately present on same circumferential groove; length between openings in first branch grooves is no more than 50% of the length of the contact surface; difference between the minimum cross-sectional void ratio in the ribs where the branch grooves are provided and the maximum cross-sectional void ratio is no greater than 10%.

4 Claims, 4 Drawing Sheets

PNEUMATIC TIRE TREAD

TECHNICAL FIELD

The present invention relates to a tread for a pneumatic tire, and more specifically it relates to a tread for a pneumatic tire in which air column resonance and tread pattern noise are reduced at the same time.

DESCRIPTION OF RELATED ART

Air column resonance in the circumferential grooves formed in tire treads is produced by resonance in the tubes (air columns) formed by these circumferential grooves and the road surface, and the resonance frequency thereof depends on the length of the air columns in the circumferential grooves which are formed with the road surface.

Air column resonance is manifested in the form of noise inside and outside a vehicle, and in many cases it has a peak at around 1 kHz which is readily caught by the human ear. In conventional technology for reducing the air column resonance in the circumferential grooves, resonators having a branch groove shape whereof one end opens into a circumferential groove formed in the tread and, branching from the open end, the other end terminates in a land part (rib) of the tread, are formed in the tread, and these resonators cause a reduction in air column resonance (Patent Document 1, for example).

FIG. 1 of Patent Document 2 shows technology in which the tread is provided with branch groove-shaped resonators whereof one end opens into a circumferential groove and the other end terminates in a land part, and resonators of a different type to the branch groove shape, which are known as Helmholtz resonators, for reducing air column resonance of various frequency bands.

FIG. 1 of Patent Document 3 shows technology in which the tread is provided with lateral grooves which communicate with two circumferential grooves, and a plurality of resonators known as Helmholtz resonators, for reducing air column resonance of various frequency bands.

FIG. 1 of Patent Document 4 shows technology in which the tread is provided with branch groove-shaped resonators having a bent-back shape in which one end opens into a circumferential groove and the other end terminates in a land part, and branch groove-shaped resonators provided with sub-grooves, for reducing air column resonance of various frequency bands.

PRIOR ART DOCUMENTS

Patent Documents

[Patent Document 1] Republished Patent WO2004/103737
[Patent Document 2] Japanese Unexamined Patent Application Publication 2008-308131
[Patent Document 3] Japanese Unexamined Patent Application Publication 2008-238867
[Patent Document 4] Japanese Unexamined Patent Application Publication 2006-151309

SUMMARY OF THE INVENTION

Issues to be Resolved by the Invention

However, there are problems in that the branch grooves need to be greater than a certain length in order to make the resonators formed by the branch groove shape act effectively, and when ribs formed with such branch grooves enter the contact surface, tread pattern noise is produced by the actual resonators formed from the branch grooves along with fluctuations in the energy produced by the ribs striking the road surface.

Tread pattern noise in this case is tire noise which is produced by fluctuations in the energy generated when the grooves extending obliquely or widthwise across the tread, such as the lateral grooves, continuously strike the road surface, depending on the pattern which is carved on the tread. The frequency of tread pattern noise depends on the speed, and varies along with the speed. This tread pattern noise also constitutes a source of noise inside and outside the vehicle.

In order to reduce air column resonance in various frequency bands when the resonators are arranged in the manner shown in FIG. 1 of Patent Documents 2 to 4, adjacent resonators need to be provided at least a prescribed distance apart over the length of the contact surface in the direction of rotation of the tire. In these cases, the tread pattern noise produced by the resonators is generated in different frequency bands to the frequency band which is damped by the resonators, and therefore the tread pattern noise generated by the resonators themselves constitutes a problem in the resonators from Patent Documents 2 to 4.

The present invention has therefore been devised in order to resolve the problems of the prior art, and it aims to provide a pneumatic tire which makes it possible to reduce tread pattern noise while at the same time effectively suppressing air column resonance produced by the circumferential grooves across a number of frequency bands.

Means of Resolving the Issues

In order to achieve the above aims, the present invention relates to a pneumatic tire tread comprising at least one circumferential groove; at least two ribs adjacent to the circumferential groove; and resonators which are formed with a groove shape in which one end opens into the circumferential groove and the other end terminates in a rib and which reduces air column resonance in the circumferential groove, the pneumatic tire tread being characterized in that: in the resonators, a plurality of branch groove sets are formed in the circumferential direction of the tire in such a way that the branch grooves of one set do not come into contact with each other on the same rib, each set of branch grooves including at least a first branch groove having a first opening which opens into the circumferential groove and a first end part which terminates in the rib, and a second branch groove having a second opening which opens into the circumferential groove and a second end part which terminates in the rib; the length of the first branch grooves of the resonators is at least 40% of the length of the contact surface, and the groove width is between 10% and 25% of the groove width of the circumferential groove, when the tire is mounted on a standard rim and inflated to the nominal inflation pressure, and the nominal load is applied; the length of the second branch grooves of the resonators is between 40% and 90% of the length of the first branch grooves, and the groove width is no less than the groove width of the first branch grooves, when the tire is mounted on a standard rim and inflated to the nominal inflation pressure, and the nominal load is applied; the first openings of the first branch grooves of the resonators and the second openings of the second branch grooves open from the same rib into the same circumferential groove and also open alternately in the direction of rotation of the tire; the first branch grooves of the resonators are formed in such a way that the length between adjacent first openings which open from the same rib into the same circumferential groove constitutes no more than 50% of the length of the contact surface, so that the whole of a first branch groove is present within the tread running surface; and the difference between the minimum cross-sectional void ratio in the rib where the first and second branch grooves of the resonators are formed and the maximum cross-sectional void ratio in said rib is no greater than 10%.

In this instance, "groove" refers to a space having width and depth which are defined by two wall surfaces, and which do not come into contact each other under normal usage conditions.

Furthermore, "circumferential groove" refers to a groove which extend in the circumferential direction of the tire; this includes not only linear grooves, but also grooves extending in a zigzag or wave-like fashion around the whole circumference of the tire.

Furthermore, "lateral groove" refers to a groove extending across the width of the tire; these may be grooves in which both ends open into a circumferential groove, grooves in which one end opens into a circumferential groove and the other end terminates in a land part (rib), or grooves in which both ends terminate in land parts, among other things. This includes not only linear lateral grooves, but also grooves extending in a zigzag or wave-like fashion, or grooves having a varied width.

Furthermore, "branch groove" refers to a groove having a shape in which one end opens into a circumferential groove and the other end terminates in a land part (rib). Branch groove is one of a form of lateral groove.

Furthermore, "contact surface" refers to the surface region of the tread which comes into contact with the road surface when the tire is mounted on a standard rim, which is determined by industry standards to be described below, and inflated to the nominal internal pressure, and the nominal load is applied. Furthermore, the "contact surface length" refers to the length of the contact surface in the direction of rotation of the tire.

Furthermore, the "standards" are regulations determined by the industry standards in force in the region where the tires are produced or used. For example, the industry standards in Europe are found in the "Standards Manual" of the ETRTO (The European Tyre and Rim Technical Organization); the industry standards in the US are found in the "Year Book" of the TRA (The Tire and Rim Association, Inc.; and the industry standards in Japan are found in the "JATMA Year Book" of the Japan Automobile Tire Manufacturers Association (JATMA). Furthermore, a "standard rim" refers to a rim which is stipulated in these standards according to the size of the tire; "nominal inflation pressure" refers to the air pressure stipulated in these standards in correspondence to the load capacity; and "nominal load" refers to the maximum permitted mass in these standards which can be loaded on the tire.

Furthermore, the "cross-sectional void ratio" refers to the proportion of the total length of a specified portion (one rib, for example) of the tire surface along an axis parallel to the axis of rotation of the tire, which is occupied by the length of the part of the same specified portion of the tire surface along the same axis which is not in contact with the ground.

According to the present invention configured in the above manner, in the resonators for reducing air column resonance in the circumferential grooves, a plurality of branch groove sets are formed in the circumferential direction of the tire in such a way that the branch grooves of one set do not come into contact with each other on the same rib, each set of branch grooves including at least a first branch groove having a first opening which opens into the circumferential groove and a first end part which terminates in the rib, and a second branch groove having a second opening which opens into the circumferential groove and a second end part which terminates in the rib. The basic principle of this kind of resonator lies in the fact that some of the sound waves propagated by the circumferential grooves are propagated into the first and second branch grooves and are reflected by the end parts of the first and second branch grooves, and again returned to the circumferential grooves. The fact that the sound waves travel back and forth along the branch grooves means that when the sound waves propagated to the branch grooves have returned to the circumferential grooves, the phase thereof is different to that of the sound waves in the circumferential grooves. This phase difference causes interference in the sound waves, and as a result air column resonance in the circumferential grooves can be reduced by the first and second branch grooves.

According to the present invention, the length of the first branch grooves of the resonators is at least 40% of the length of the contact surface when the tire is mounted on a standard rim and inflated to the nominal inflation pressure, and the nominal load is applied, and therefore it is possible to achieve the length needed in order to reduce the air column resonance in the circumferential grooves and to effectively achieve an effect whereby the air column resonance is reduced.

In addition, the groove width of the first branch grooves of the resonators is between 10% and 25% of the groove width of the circumferential groove, and therefore it is possible to suppress the phenomenon of the first branch grooves on the tread running surface being closed off by the load, and the resonator effect no longer being demonstrated, while it is also possible to suppress the influence on other essential aspects of tire performance due to a greater proportion of the ribs being occupied by the first branch grooves.

In addition, the length of the second branch grooves of the resonators is between 40% and 90% of the length of the first branch grooves, and the groove width is no less than the groove width of the first branch grooves. In this instance, when air column resonance is reduced by one branch groove-shaped resonator, it is conventionally the case that the acoustic pressure of the frequency band produced by the resonator is reduced, but an acoustic pressure peak is produced in another frequency band. According to the present invention, however, the second branch grooves which form a set with the first branch grooves are provided, and the length of the second branch grooves is between 40% and 90% of the length of the first branch grooves, and therefore the frequency band of the acoustic pressure which can be reduced by the second branch grooves does not stray from a frequency band which is suitable for causing a reduction in the acoustic pressure peak produced by the first branch grooves, and as a result it is possible to effectively reduce the acoustic pressure peak in the other frequency band which is produced when the air column resonance in the circumferential grooves has been reduced by the first branch grooves. It is thus possible to reduce the acoustic pressure peaks of a plurality of frequency bands (the acoustic pressure peaks of at least two frequency bands) by providing resonators in sets comprising at least the first and second branch grooves on the same rib, and it is possible to reduce the noise level of the tire as a whole.

In addition, the first openings of the first branch grooves and the second openings of the second branch grooves in the resonators open from the same rib into the same circumferential groove and also open alternately in the direction of rotation of the tire, and therefore the first branch grooves make it possible to reduce the air column resonance in the circumferential groove where they open, and by virtue of the second branch grooves it is possible to reduce the acoustic pressure peak in a different frequency band produced in the same circumferential groove by the reduction in the air column resonance produced by the first branch grooves.

In addition, the first branch grooves of the resonators are formed in such a way that the length between adjacent first openings which open from the same rib into the same circumferential groove constitutes no more than 50% of the length of the contact surface, so that the whole of a first branch groove is present within the contact surface, and therefore at least one first branch groove is present in the contact surface, and the action as a resonator can be ensured. This means that it is possible to reliably reduce the air column resonance in the circumferential grooves.

In addition, the difference between the minimum cross-sectional void ratio in the rib where the first and second branch grooves of the resonators are formed and the maximum cross-sectional void ratio in said rib is no greater than 10%, and therefore the rib width excluding the groove portions of the first and second branch grooves in the ribs is generally constant around the tire, which means that it is possible for the most part to regularize fluctuations in the energy from striking the road surface when ribs formed with the first and second branch grooves enter the contact surface; as a result, it is possible to reduce the tread pattern noise. It should be noted that if the difference between the minimum cross-sectional void ratio and the maximum cross-sectional void ratio is greater than 10%, fluctuations in the energy from striking the road surface increase, and as a result the tread pattern noise reducing effect becomes smaller.

The results of the above points mean that it is possible to reduce the tread pattern noise while also effectively suppressing air column resonance produced by the circumferential grooves over a plurality of frequency bands.

According to the present invention, the first branch grooves of the resonators are preferably formed in such a way that the actual projected length thereof in the lateral direction on the tread running surface is greater than the projected length in the lateral direction of the straight line joining the first openings and the first end parts thereof.

According to the present invention configured in this manner, the first branch grooves of the resonators are formed in such a way that the actual projected length thereof in the lateral direction on the contact surface is greater than the projected length in the lateral direction of the straight line joining the first openings and the first end parts thereof, and therefore it is possible to ensure that the first branch grooves have a prescribed branch groove length, even if the ribs are relatively narrow in width, which means that it is possible to more reliably reduce air column resonance in the circumferential grooves. The projected length in the lateral direction of the straight line joining the first openings and the first end parts of the first branch grooves is shorter than the actual projected length of the first branch grooves in the lateral direction on the tread running surface, and therefore by placing the openings and end parts in the width direction of the rib, a large number of branch grooves can be arranged within the contact surface, for example. As a result, air column resonance can be more effectively reduced.

According to the present invention, preferably the second end parts of the second branch grooves of the resonators are present within a region which is enclosed by the first branch groove which actually forms a set with said second branch groove, and a straight line joining the first opening and the first end part of the first branch groove.

According to the present invention configured in this manner, the second end parts of the second branch grooves of the resonators are present within a region which is enclosed by the first branch groove which actually forms a set with said second branch groove, and a straight line joining the first opening and the first end part of the first branch groove, and therefore it is possible to arrange the second branch grooves close to the first branch grooves, and as a result it is possible to shorten the length from the first opening which constitutes the opening to the circumferential groove of the first branch groove which continues in the circumferential direction of the tire; this means that a large number of branch grooves can be arranged within the contact surface. As a result, air column resonance can be more effectively reduced.

According to the present invention, the first branch grooves of the resonators preferably have a first portion including the first opening and a second portion including the first end part, and the angle between the first portion and the second portion is preferably less than 90°.

According to the present invention configured in this manner, the first branch grooves of the resonators are formed in such a way that the angle between the first portion including the first opening and the second portion including the first end part is less than 90°, and therefore it is possible to easily design the tread in such a way that the difference between the minimum cross-sectional void ratio in the rib where the branch grooves are arranged and the maximum cross-sectional void ratio in said rib is no greater than 10%. This means that the rib width excluding the groove portion thereof is generally constant around the tire. That is to say, it is possible for the most part to regularize fluctuations in the energy from striking the road surface when the ribs enter the tread running surface; as a result, it is possible to reduce the tread pattern noise.

Advantages of the Invention

With the pneumatic tire tread according to the present invention, it is possible to reduce tread pattern noise while at the same time effectively suppressing air column resonance produced by the circumferential grooves across a number of frequency bands, and as a result it is possible to reduce the noise level of the tire as a whole.

MODES OF EMBODIMENT OF THE INVENTION

Features and advantages of the present invention will be described next with reference to the figures which show several exemplary modes of embodiment of the present invention.

A pneumatic tire tread according to a first mode of embodiment of the present invention will be described first of all with the aid of FIGS. 1 and 2.

Figure 1:
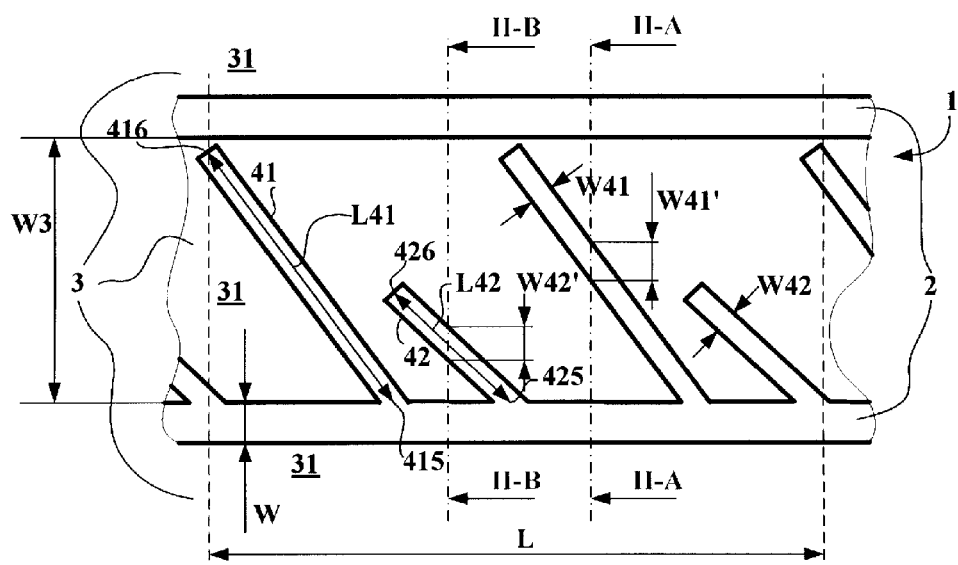
FIG. 1 schematically shows the pneumatic tire tread according to a first mode of embodiment of the present invention.
Figure 2A:
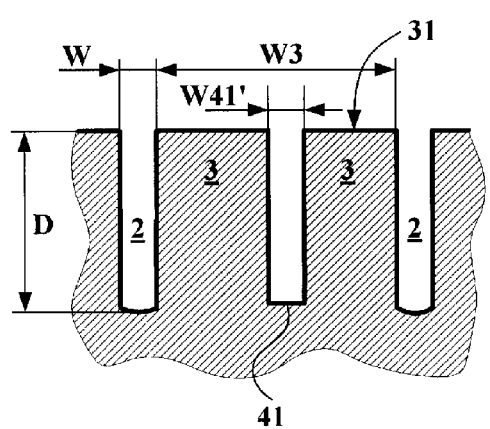
FIG. 2A is an enlarged view in cross section of the tire tread seen along the line IIA-IIA in FIG. 1.
Figure 2B:
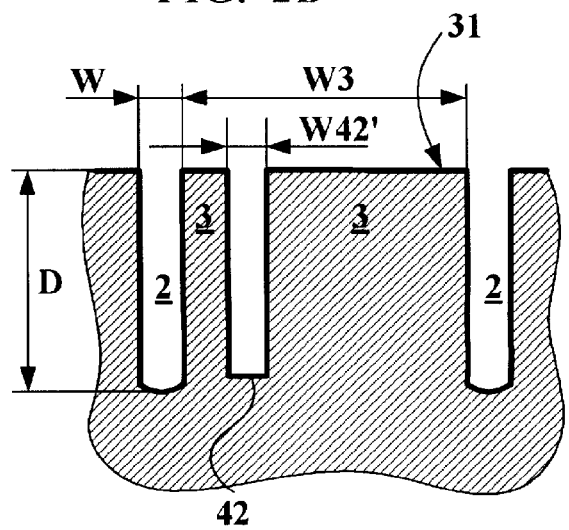
FIG. 2B is an enlarged view in cross section of the tire tread seen along the line IIB-IIB in FIG. 1.

FIG. 1 schematically shows the pneumatic tire tread according to the first mode of embodiment of the present invention; FIG. 2A is an enlarged view in cross section of the tread 1 seen along the line IIA-IIA in FIG. 1; and FIG. 2B is an enlarged view in cross section of the tread 1 seen along the line IIB-IIB in FIG. 1.

First of all, as shown in FIG. 1, the symbol 1 denotes part of a tire tread 1 according to the first mode of embodiment; two circumferential grooves 2 of width W are formed in the tread 1, and ribs 3 which are delimited by the circumferential grooves 2 are also formed therein. It should be noted that the tire size in this example is 225/55R16.

The ribs 3 have a surface 31 which makes contact with the road surface when the tire is in operation. This figure shows the contact surface length L when the tire is inflated to the nominal inflation pressure and the nominal load is applied. It should be noted that the standard rim for this size is 7J, the nominal inflation pressure is 250 kPa, and the nominal load is 690 kg, according to the "ETRTO Standard Manual 2009".

A large number of branch groove-shaped resonators whereof one end opens into the circumferential groove and the other end terminates in the rib 3 are formed on the rib 3, and serve to reduce the air column resonance produced in the circumferential groove 2 when the tire is in operation. In this mode of embodiment, these resonators consist of sets of branch grooves having different lengths, namely first branch grooves 41 and second branch grooves 42; the first branch grooves 41 and the second branch grooves 42 are formed so as not to come into contact with each other. A plurality of such sets of branch grooves 41, 42 are provided in the circumferential direction of the tire.

The first branch grooves 41 open at openings 415 into the circumferential groove 2 having the groove width W, and terminate at end parts 416 on the rib 3.

The first branch grooves 41 have the length L41, and this length L41 is at least 40% of the contact surface length L, when the tire is mounted on a standard rim and inflated to the nominal inflation pressure, and the nominal load is applied. In this mode of embodiment, the first branch groove length L41 is 121 mm, and the contact surface length L is 145 mm. If the first branch groove length L41 is less than 40% of the contact surface length L, it is not possible to achieve the length needed to reduce the air column resonance in the circumferential grooves 2, and the air column resonance reducing effect is lowered.

The first branch groove width W41 is between 10% and 25% of the width W of the circumferential grooves 2, when the tire is mounted on a standard rim and inflated to the nominal inflation pressure, and the nominal load is applied. In this mode of embodiment, the first branch groove width W41 is 2.8 mm, and the circumferential groove width W is 16 mm. If the first branch groove width W41 is less than 10% of the circumferential groove width W, the first branch grooves in the contact surface are closed off by the load, and the effect of serving as a resonator is no longer demonstrated. Furthermore, if this width is above 25%, the proportion of the rib occupied by the first branch grooves is larger, and this affects other essential aspects of tire performance.

The second branch grooves 42 open at openings 425 into the same circumferential groove 2 where the first branch grooves 41, which make up the set, also open; and they terminate at end parts 426 on the same rib 3 where the first branch grooves 41, which make up the set, also terminate.

The second branch grooves have the length L42, and this length L42 is between 40% and 90% of the length L41 of the first branch grooves 41 which make up the set, when the tire is mounted on a standard rim and inflated to the nominal inflation pressure, and the nominal load is applied. In this mode of embodiment, the second branch groove length L42 is 58 mm. If the length L42 of the second branch grooves 42 is less than 40% or greater than 90% of the length L41 of the first branch grooves which make up the set, the frequency band of the acoustic pressure which can be reduced by the second branch grooves 42 strays from a frequency band which is suitable for causing a reduction in the acoustic pressure peak produced by a frequency band that is different from the frequency band produced when the air column resonance in the circumferential grooves 2 has been reduced by the first branch grooves 41, and there is a drop in the air column resonance reduction effect.

The groove width W42 of the second branch grooves 42 is formed so as to be no less than the groove width W41 of the first branch grooves 41 which make up the set, when the tire is mounted on a standard rim and inflated to the nominal inflation pressure, and the nominal load is applied. In this mode of embodiment, the second branch groove width W42 is 3.6 mm.

The first branch grooves 41 and the second branch grooves 42 which make up a set are formed on the same rib 3 and open into the same circumferential groove 2. When seen from the direction of rotation of the tire, the openings 415 of the first branch grooves and the openings 426 of the second branch grooves open from the same rib 3 into the same circumferential groove 2, and these openings 415, 425 are provided so as to appear alternately on the same circumferential groove 2. This configuration makes it possible to reduce the air column resonance in the circumferential groove 2 where the first branch grooves 41 open, by virtue of said first branch grooves 41, and also, by virtue of the second branch grooves 42, to reduce the acoustic pressure peak in a different frequency band produced in the same circumferential groove 2 by the reduction in the air column resonance produced by the first branch grooves 41.

The first branch grooves 41 are formed in such a way that the length between adjacent openings 415 in the circumferential direction of the tire which open into the same circumferential groove 2 constitutes no more than 50% of the contact surface length. This means that at least one first branch groove 41 is present in the tread running surface, and the action as a resonator is not lost. It is therefore possible to reliably reduce the air column resonance in the circumferential groove 2 by means of this configuration.

As shown in FIGS. 2A and 2B, the circumferential grooves 2, first branch grooves 41, and second branch grooves 42 each open at the surface 31 in contact with the road surface. The groove depth of the circumferential grooves 2 is D, and the groove depths of the first branch grooves 41 and second branch grooves 42 are the same as each other, and are, at the maximum, the same as the circumferential grooves 2, i.e., D.

The rib 3, where the first branch grooves 41 and the second branch grooves 42 are formed, is formed in such a way that the difference between the minimum cross-sectional void ratio in said rib and the maximum cross-sectional void ratio in said rib is no greater than 10%. In this mode of embodiment, the minimum cross-sectional void ratio in the ribs 3 is 13.8%, and the maximum is 18.3%. By means of this configuration, the width of the ribs 3 excluding the groove portions is generally constant around the tire, which means that it is possible for the most part to regularize fluctuations in the energy from striking the road surface when said ribs 3 enter the contact surface; as a result, it is possible to reduce the tread pattern noise.

The cross-sectional void ratio will be described using FIGS. 1 and 2: this refers to the proportion of the total length (total widthwise length) W3 of the ribs 3 on the tire surface along an axis parallel to the axis of rotation of the tire (the line IIA-IIA or the line IIB-IIB in FIG. 1, for example) which is occupied by the length of the part of the ribs 3 on the tire surface along the same axis (the same line IIA-IIA or IIB-IIB) which is not in contact with the ground (W41' or W42').

In this case, when the directions in which the two branch grooves extend are different, the groove width of the branch grooves extending in a direction which is further from the direction parallel to the axis of rotation of the tire (the second branch grooves 42 in this mode of embodiment) should be greater than the groove width of the other branch grooves extending in a direction which is closer to the direction parallel to the axis of rotation of the tire (the first branch grooves 41 in this mode of embodiment), in order to keep the difference between the minimum cross-sectional void ratio and the maximum cross-sectional void ratio in the ribs 3 at or below a certain value. In this mode of embodiment, the second branch grooves 42 extend in a direction which is further from the direction parallel to the axis of rotation of the tire than the first branch grooves 41, and so the groove width of the second branch grooves 42 is made proportionally greater than the groove width of the first branch grooves 41, as described above; this means that the cross-sectional void ratio is substantially constant over all cross sections, and the difference between the minimum cross-sectional void ratio and the maximum cross-sectional void ratio can be kept to 10% or less.

If we compare FIGS. 2A and 2B, it can be understood that the cross-sectional void ratio is generally constant in the ribs 3 provided with the branch groove-shaped resonators. That is to say, the first branch grooves 41 and the second branch grooves 42 each have a different angle of inclination with respect to the circumferential grooves 2 or the axis parallel to the axis of rotation of the tire, and as described above, the groove width W42 of the second branch grooves 42 is greater than the groove width W41 of the first branch grooves 41. However, if we take the cross section on the axis parallel to the axis of rotation of the tire for the part where the second branch grooves 42 extend in a direction which is distant from the axis parallel to the axis of rotation of the tire, then the length W42' in the cross section thereof is almost the same as the length W41' of the first branch grooves 41 in the cross section on the axis parallel to the axis of rotation of the tire, and thus it is possible to reduce the difference between the minimum cross-sectional void ratio and the maximum cross-sectional void ratio of the ribs 3.

In this way, the tread 1 in this mode of embodiment is formed in such a way that the difference between the minimum cross-sectional void ratio of the ribs 3 and the maximum cross-sectional void ratio of said ribs is no more than 10%.

The pneumatic tire tread according to a second mode of embodiment of the present invention will be described next with the aid of FIGS. 3 and 4.

Figure 3:
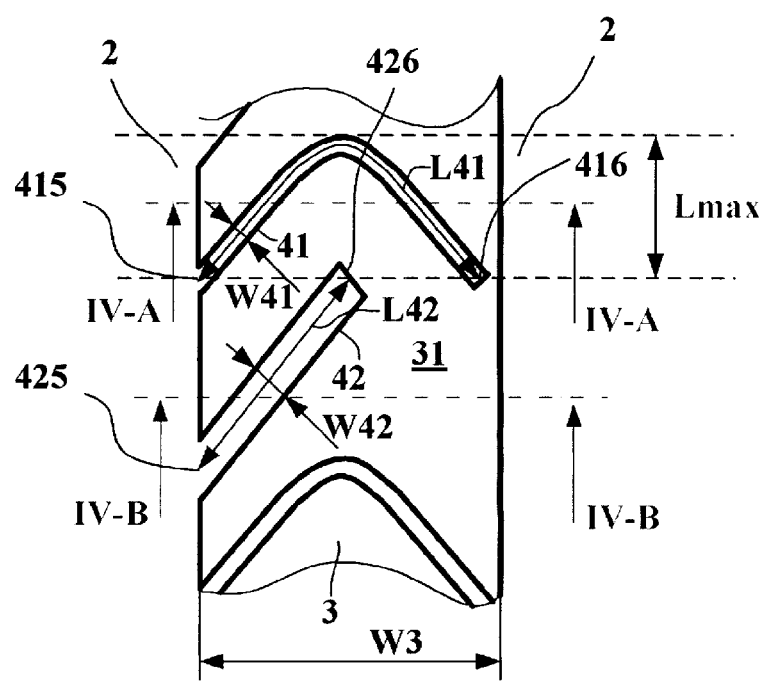
FIG. 3 schematically shows the pneumatic tire tread according to a second mode of embodiment of the present invention.
Figure 4A:
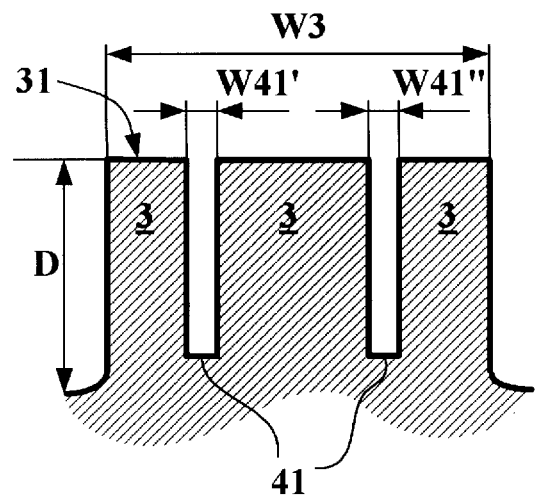
FIG. 4A is an enlarged view in cross section of the tire tread seen along the line IVA-IVA in FIG. 3.
Figure 4B:
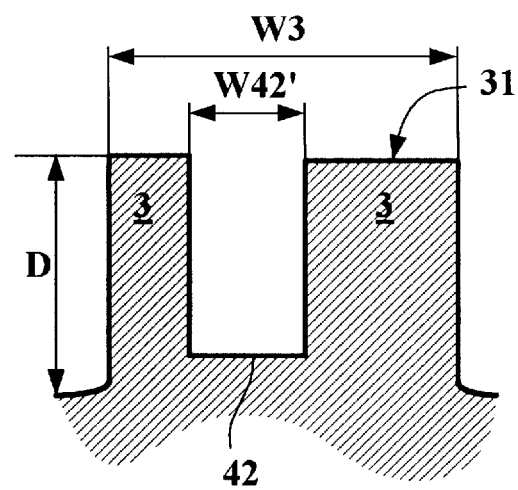
FIG. 4B is an enlarged view in cross section of the tire tread seen along the line IVB-IVB in FIG. 3.

FIG. 3 schematically shows the pneumatic tire tread according to the second mode of embodiment of the present invention; FIG. 4A is an enlarged view in cross section of the tread 1 seen along the line IVA-IVA in FIG. 3; and FIG. 4B is an enlarged view in cross section of the tread 1 seen along the line IVB-IVB in FIG. 3.

As shown in FIG. 3, in the second mode of embodiment there are formed: two circumferential grooves 2; a rib formed between the circumferential grooves 2; first branch grooves 41 which are formed in the rib 3 and curve in the circumferential direction of the tire; and substantially linear second branch grooves 42 which extend obliquely from the circumferential groove 2.

Here, the following points regarding the length and groove width of the first branch grooves 41 and second branch grooves 42 are the same as in the first mode of embodiment described above: the fact that when the tire is mounted on a standard rim and inflated to the nominal inflation pressure, and the nominal load is applied, the length L41 along the curved axis of the first branch grooves 41 is at least 40% of the contact surface length L; the linear length L42 of the second branch grooves is between 40% and 90% of the length along the curved axis of the first branch grooves 41; the groove width W41 of the first branch grooves 41 is between 10% and 25% of the groove width W of the circumferential grooves 2; and the groove width W42 of the second branch grooves 42 is greater than the groove width W41 of the first branch grooves 41. Furthermore, the fact that the openings 415, 425 are provided so as to appear alternately on the circumferential groove 2, and the fact that the openings 415 in the first branch grooves 41 are formed in such a way that the length between adjacent openings 415 in the circumferential direction of the tire which open into the same circumferential groove 2 constitutes no more than 50% of the tread running surface length are also the same as in the first mode of embodiment. The advantages achieved in this way are of course also the same as in the first mode of embodiment, and so they will not be described again.

As shown in FIG. 3 the first branch grooves 41 have a curved shape between the openings 415 and end parts 416 thereof. The positional relationship between the respective end parts 415, 416 of the first branch grooves 41 is such that the actual projected length in the lateral direction (the widthwise direction of the tire) of the first branch grooves 41 (the projected length in the left-right direction in FIG. 3) is greater than the projected length in the lateral direction (same as above) of the straight line joining the openings 415 and the end parts 416 thereof. It should be noted that the shape of the pattern is not limited to what is shown in FIG. 3, and a "<"-shaped pattern is equally feasible, provided that the actual projected length in the lateral direction of the first branch grooves 41 is greater than the projected length in the lateral direction of the straight line joining the openings 415 and the end parts 416.

The reason for forming the first branch grooves in this way is so that as many first branch grooves 41 as possible can be provided in the circumferential direction of the tire, while the prescribed branch groove length L41 is maintained within a rib 3 having a prescribed width. That is to say, when the first branch grooves 41 are linear, a wide rib is needed, but if the first branch grooves 41 are formed in such a way that the projected length in the lateral direction of the straight line joining the openings 415 and end parts 416 is shorter than the overall projected length in the lateral direction of the first branch grooves 41, a greater number of first branch grooves 41 can be placed at intervals in the circumferential direction of the tire, while the prescribed branch groove length L41 is maintained, even if the rib is relatively narrow. As a result, the air column resonance in the circumferential groove 2 can be more reliably reduced.

In this mode of embodiment, the first branch grooves 41 and the second branch grooves 42 are formed in such a way that the difference between the minimum cross-sectional void ratio in the rib 3 where they are formed and the maximum cross-sectional void ratio in said rib 3 is no greater than 10%.

If we compare FIGS. 4A and 4B, it can be understood that the cross-sectional void ratio is generally constant in the ribs 3 provided with the branch groove-shaped resonators. That is to say, there is not a large difference between the portion comprising the two combined lengths W41', W41" of the first branch grooves 41 along the axis parallel to the axis of rotation of the tire (the line IVA-IVA in the examples shown in FIGS. 3 and 4A), which is shown in FIG. 4A, and the length W42' of the second branch grooves 42 along the axis parallel to the axis of rotation of the tire (the line IVB-IVB in the examples shown in FIGS. 3 and 4A), which is shown in FIG. 4B, and in this mode of embodiment the length of the portion which is not in contact with the ground with respect to the length W3 of the ribs 3 in the lateral direction (in the examples shown in FIGS. 4A and 4B, the two combined lengths W41' and W41" or the length W42') is substantially constant over all cross sections, and the difference between the minimum cross-sectional void ratio and the maximum cross-sectional void ratio in the ribs 3 can be kept to 10% or less.

Figure 5:
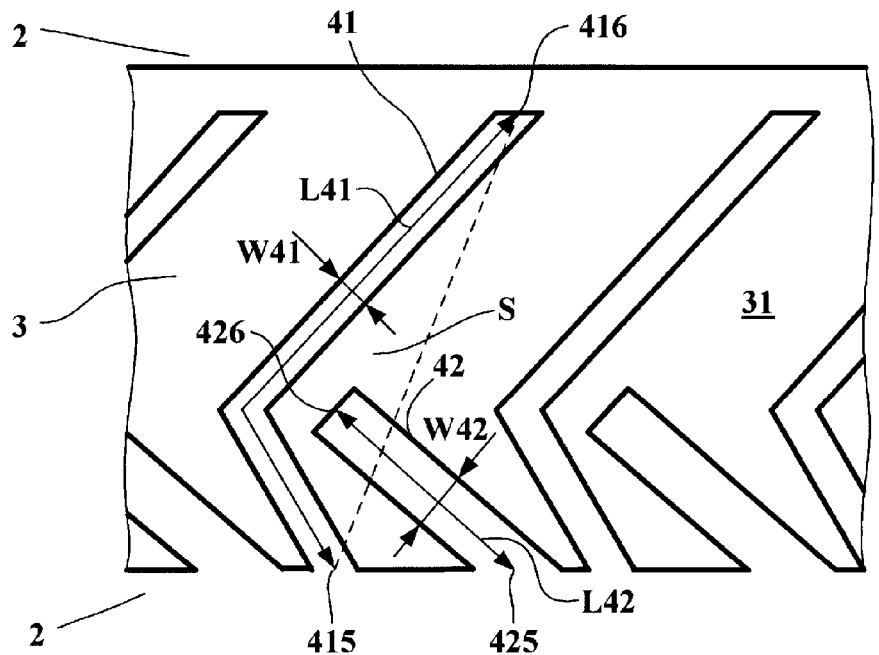
FIG. 5 schematically shows the pneumatic tire tread according to a third mode of embodiment of the present invention.

The pneumatic tire tread according to a third mode of embodiment of the present invention will be described next with the aid of FIG. 5. FIG. 5 schematically shows the pneumatic tire tread according to the third mode of embodiment of the present invention.

As shown in FIG. 5, in the third mode of embodiment, there are formed: two circumferential grooves 2; a rib formed between the circumferential grooves 2; first branch grooves 41 which are formed in the rib 3 and extend in a "<"-shape; and substantially linear second branch grooves 42 which extend obliquely from the circumferential groove 2.

Here, the following points regarding the length and groove width of the first branch grooves 41 and second branch grooves 42 are the same as in the first mode of embodiment described above: the fact that when the tire is mounted on a standard rim and inflated to the nominal inflation pressure, and the nominal load is applied, the length L41 along the "<"-shaped axis of the first branch grooves 41 is at least 40% of the tread running surface length L; and the linear length L42 of the second branch grooves 42 is between 40% and 90% of the length L41 along the "<"-shaped axis of the first branch grooves 41. Furthermore, with regard to the groove width of the first branch grooves 41 and second branch grooves 42, the fact that the groove width W41 of the first branch grooves 41 is between 10% and 25% of the width W of the circumferential grooves 2, and the groove width W42 of the second branch grooves is greater than the groove width W41 of the first branch grooves 41 is the same as in the first mode of embodiment. Furthermore, the fact that the openings 415, 425 are provided so as to appear alternately on the circumferential groove 2, and the fact that the openings 415 in the first branch grooves 41 are formed in such a way that the length between adjacent openings 415 in the circumferential direction of the tire which open into the same circumferential groove 2 constitutes no more than 50% of the contact surface length are also the same as in the first mode of embodiment. The advantages achieved in this way are of course also the same as in the first mode of embodiment, and so they will not be described again.

As shown in FIG. 5, in the third mode of embodiment, the first branch grooves 41 and second branch grooves 42 are formed in such a way that the end part 426 of the second branch grooves 42 is present within a region S delimited (enclosed) by the first branch grooves 41 which makes up the actual set therewith and the straight line which joins the opening 415 of the first branch groove and the end part 416 thereof. In other words, the first branch grooves 41 extend in a "<"-shape to form a region S which is enclosed by the straight line which joins the openings 415 and end parts 416 of said first branch grooves 41, and the second branch grooves 42 are formed in such a way that the end parts 426 of the second branch grooves 42 are present within the region S.

The advantage of this shape lies in the fact that it is possible to shorten the length between two openings 415 in the direction of rotation of the tire in the first branch grooves 41 which are disposed on the same rib 3 and open into the same circumferential groove 2, while the length L41 of the first branch grooves 41 is maintained, and this means that a greater number of branch groove-shaped resonators can be placed in the contact surface, so that the air column resonance can be effectively reduced.

In this mode of embodiment also, the difference between the minimum cross-sectional void ratio in the rib 3 where the branch groove-shaped resonators 41, 42 are formed and the maximum cross-sectional void ratio in said rib is no greater than 10%, in the same way as in the first and second modes of embodiment described above. The detailed description of this fact is as described above in relation to the first and second modes of embodiment. The first branch grooves 41 and second branch grooves 42 in the third mode of embodiment therefore make it possible to reduce the air column resonance in the circumferential grooves 2 in several frequency bands, while at the same time reducing the tread pattern noise.

The pneumatic tire tread according to a fourth mode of embodiment will be described next with the aid of FIG. 6.

Figure 6:
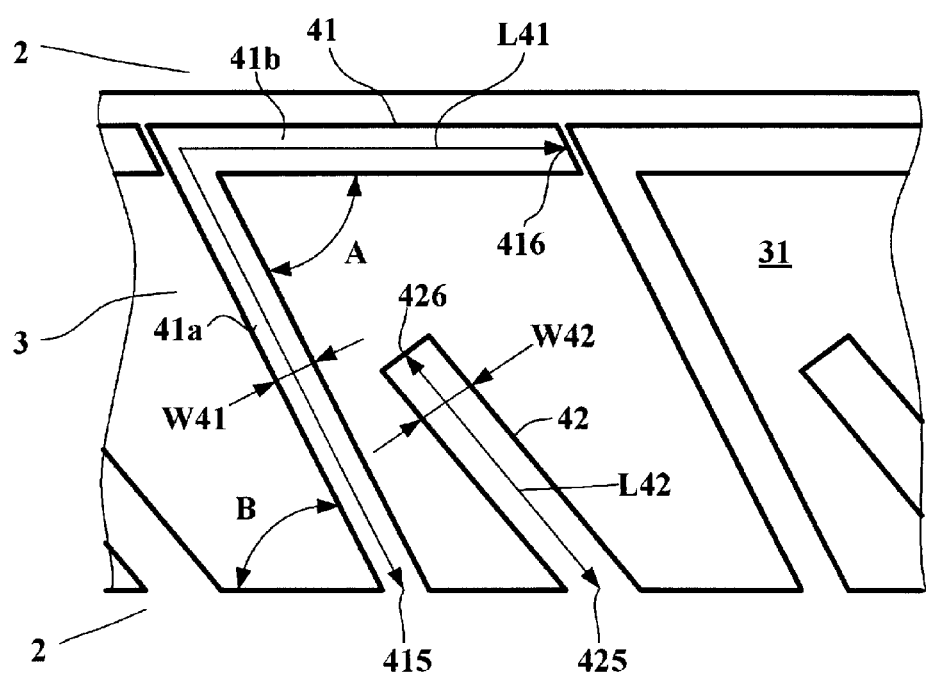
FIG. 6 schematically shows the pneumatic tire tread according to a fourth mode of embodiment of the present invention.

FIG. 6 schematically shows the pneumatic tire tread according to a fourth mode of embodiment of the present invention.

As shown in FIG. 6, in the fourth mode of embodiment, there are formed: two circumferential grooves 2; a rib formed between the circumferential grooves 2; and first branch grooves 41 and second branch grooves 42 which are formed in the rib 3.

The first branch grooves 41 comprise first portions 41a which extend from the openings 415 thereof in a substantially linear fashion obliquely with respect to the circumferential groove 2, and second portions 41b which extend in a substantially linear fashion so as to form an enclosing angle A with the first portions 41a and which terminate at the end parts 416, the first branch grooves being formed in such a way that the enclosing angle A between the first portions 41a and the second portions 41b is less than 90°. The enclosing angle A in the fourth mode of embodiment is 50°. It should be noted that the first portions 41a and the second portions 41b may have a curved shape provided that the enclosing angle A is formed.

The second branch grooves 42 open at the openings 425 in the circumferential groove 2, and terminate at the end parts 426 on the rib 3. Furthermore, the second branch grooves 42 extend obliquely with respect to the circumferential groove 2 at the openings 426 and have a substantially linear shape.

Here, the following points regarding the length of the first branch grooves 41 and second branch grooves 42 are the same as in the first mode of embodiment described above: the fact that the length L41 which is the combined lengths of the first portions 41a and the second portions 41b of the first branch grooves 41 is at least 40% of the contact surface length L, and the length L42 of the second branch grooves 42 is between 40% and 90% of the length L41 of the first branch grooves 41. Furthermore, with regard to the groove width of the first branch grooves 41 and second branch grooves 42, the fact that the groove width W41 of the first branch grooves 41 is between 10% and 25% of the width W of the circumferential grooves 2, and the groove width W42 of the second branch grooves 42 is greater than the groove width W41 of the first branch grooves 41 is the same as in the first mode of embodiment. Furthermore, the fact that the openings 415, 425 are provided so as to appear alternately on the circumferential groove 2, and the fact that the openings 415 in the first branch grooves 41 are formed in such a way that the length between adjacent openings 415 in the circumferential direction of the tire which open into the same circumferential groove 2 constitutes no more than 50% of the contact surface length are also the same as in the first mode of embodiment. The advantages achieved in this way are of course also the same as in the first mode of embodiment, and so they will not be described again.

The second branch grooves 42 are disposed on the inner side of the first branch grooves 41 which are folded back in this way (the side of the enclosing angle A) and on the circumferential groove 2 side. This arrangement in which the first branch grooves 41 are folded back and the second branch grooves 42 approach the first branch grooves 41 makes it possible to place a greater number of branch grooves 41, 42 within the contact surface, and to reduce the air column resonance more effectively in several frequency bands.

In the fourth mode of embodiment also, the first branch grooves 41 and the second branch grooves 42 are formed in such a way that the difference between the minimum cross-sectional void ratio in the rib 3 where the resonators formed by the first branch grooves 41 and second branch grooves 42 are disposed and the maximum cross-sectional void ratio in said rib is no greater than 10%. The detailed description of this fact is as described above in relation to the first and second modes of embodiment. The branch grooves 41, 42 therefore make it possible to reduce the air column resonance in the circumferential grooves 2 in several frequency bands, while also reducing the tread pattern noise.

The design of the pattern arrangement of the first branch grooves 41 and second branch grooves 42 on the rib 3 takes account of the cross-sectional void ratio; provided that the branch grooves are formed in such a way that the first portion 41a of the first branch grooves 41 is formed to extend obliquely with respect to the circumferential groove 2 and the enclosing angle between the first portion 41a and second portion 41b of the first branch grooves 41 is less than 90°, it is a simple matter to ensure that the difference between the minimum cross-sectional void ratio in the rib 3 and the maximum cross-sectional void ratio in said rib is no greater than 10%.

In addition, in the fourth mode of embodiment, the angle of inclination B of the first portion 41a with respect to the circumferential groove 2 is appropriately set in such a way that the difference between the minimum cross-sectional void ratio in the rib 3 and the maximum cross-sectional void ratio in said rib is no greater than 10%. In this mode of embodiment, the angle of inclination B is 50°, which is the same as the abovementioned enclosing angle A, but this is not limiting, and the angles A and B may of course be different, and the angle of inclination B may be other than 50°.

It should be noted that in the first to fourth modes of embodiment described above, one set of first branch grooves 41 and second branch grooves 42 is provided on a single rib 3, but it is equally possible for one set of first branch grooves 41 and second branch grooves 42 to be provided on both sides of two ribs 3 adjacent to one circumferential groove 2, or on a plurality of ribs (all denoted by the symbol 3 in FIG. 1) adjacent to two or more circumferential grooves 2.

It should be noted that the various numerical values and effects mentioned in the first to fourth modes of embodiments described above, for instance "If the first branch groove length L41 is less than 40% of the contact surface length L, it is not possible to achieve the length needed to reduce the air column resonance in the circumferential grooves 2, and the air column resonance reducing effect is lowered" are all findings obtained through experimentation with typical tire sizes when the tire is mounted on a standard rim and inflated to the nominal inflation pressure, and the nominal load is applied, in accordance with the abovementioned "standards" (the European "Standards Manual", the US "Year Book", and the Japanese "JATMA Year Book").

Particularly preferred modes of embodiment of the present invention have been described above, but the present invention is not limited to the modes of embodiment shown in the figures, and various modifications may be made thereto.

KEY TO SYMBOLS 2 circumferential groove
3 rib
31 surface which makes contact with the road surface when the tire is in operation
41 first branch groove
41a first portion of first branch groove
41b second portion of first branch groove second branch groove
415 opening of first branch groove into circumferential groove
416 end part of first branch groove in rib
425 opening of second branch groove into circumferential groove
426 end part of second branch groove in rib

The invention claimed is:

1. A pneumatic tire tread comprising at least one circumferential groove; at least two ribs adjacent to the circumferential groove; and resonators which are formed with a groove shape in which one end opens into the circumferential groove and the other end terminates in a rib and which reduces air column resonance in the circumferential groove, wherein:

the resonators comprise a plurality of sets of branch grooves formed in the circumferential direction of the tire in such a way that the branch grooves of one set do not come into contact with each other on the same rib, wherein each set of branch grooves comprises:

a first branch groove having: a first opening which opens into the circumferential groove, a first end part which terminates in the rib, and a width, and a second branch groove having: a second opening which opens into the circumferential groove, a second end part which terminates in the rib, and a width;

wherein the length of the first branch groove of the resonators is at least 40% of the length of the contact surface, and the width of the first branch groove is between 10% and 25% of the groove width of the circumferential groove, when the tire is mounted on a standard rim and inflated to the nominal inflation pressure, and the nominal load is applied;

wherein the length of the second branch groove of the resonators is between 40% and 90% of the length of the first branch grooves, and the width of the second branch groove is no less than the width of the first branch groove, when the tire is mounted on a standard rim and inflated to the nominal inflation pressure, and the nominal load is applied;

the first openings of the first branch grooves of the resonators and the second openings of the second branch grooves open from the same rib into the same circumferential groove and also open alternately in the direction of rotation of the tire;

the first branch grooves of the resonators are formed in such a way that the length between adjacent first openings which open from the same rib into the same circumferential groove constitutes no more than 50% of the length of the contact surface, so that the whole of a first branch groove is present within the tread running surface; and the difference between the minimum cross-sectional void ratio in the rib where the first and second branch grooves of the resonators are formed and the maximum cross-sectional void ratio in said rib is no greater than 10%.

2. The pneumatic tire tread according to claim 1, wherein the first branch grooves of the resonators are formed in such a way that the actual projected length thereof in the lateral direction on the contact surface is greater than the projected length in the lateral direction of the straight line joining the first openings and the first end parts thereof.

3. The pneumatic tire tread according to claim 1, wherein the second end parts of the second branch grooves of the resonators are present within a region which is enclosed by the first branch groove which actually forms a set with said second branch groove, and a straight line joining the first opening and the first end part of the first branch groove.

4. The pneumatic tire tread according to claim 3, wherein the first branch grooves of the resonators have a first portion including the first opening and a second portion including the first end part, and the angle between the first portion and the second portion is less than 90°.

* * * * *